US009043601B2

(12) United States Patent
Brundage et al.

(10) Patent No.: US 9,043,601 B2
(45) Date of Patent: *May 26, 2015

(54) DIGITAL WATERMARK KEY GENERATION

(75) Inventors: Trent J. Brundage, Portland, OR (US); Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,037

(22) Filed: Mar. 20, 2012

(65) Prior Publication Data

US 2012/0179914 A1    Jul. 12, 2012

Related U.S. Application Data

(62) Division of application No. 11/140,540, filed on May 26, 2005, now Pat. No. 8,140,848.

(60) Provisional application No. 60/585,177, filed on Jul. 1, 2004.

(51) Int. Cl.
| | |
|---|---|
| *H04L 9/32* | (2006.01) |
| *H04L 9/08* | (2006.01) |
| *G06T 1/00* | (2006.01) |
| *H04N 1/32* | (2006.01) |
| *H04N 21/2389* | (2011.01) |
| *H04N 21/266* | (2011.01) |
| *H04N 21/8358* | (2011.01) |
| *G10L 19/018* | (2013.01) |

(52) U.S. Cl.
CPC ............ *H04L 9/0816* (2013.01); *G06T 1/0071* (2013.01); *G10L 19/018* (2013.01); *H04N 1/32144* (2013.01); *H04N 21/23892* (2013.01); *H04N 21/26613* (2013.01); *H04N 21/8358* (2013.01); *H04N 2201/3233* (2013.01); *H04N 2201/3269* (2013.01); *H04N 2201/3281* (2013.01); *H04N 2201/3284* (2013.01)

(58) Field of Classification Search
CPC  G06T 1/0071; H04L 9/0816; H04N 1/32144; H04N 21/23892; H04N 21/26613; H04N 21/8358; H04N 2201/3284
USPC ............. 713/176; 380/44; 382/248, 312, 276, 382/100

See application file for complete search history.

(56) References Cited

U.S. PATENT DOCUMENTS

| | | | | |
|---|---|---|---|---|
| 6,614,914 | B1 * | 9/2003 | Rhoads et al. | 382/100 |
| 7,487,356 | B2 * | 2/2009 | Kunisa | 713/176 |
| 2002/0199110 | A1 * | 12/2002 | Kean | 713/189 |
| 2003/0026453 | A1 * | 2/2003 | Sharma et al. | 382/100 |
| 2003/0152225 | A1 * | 8/2003 | Kunisa | 380/210 |

* cited by examiner

*Primary Examiner* — Samson Lemma
(74) *Attorney, Agent, or Firm* — Digimarc Corporation

(57) ABSTRACT

This disclosure relates to message encoding. One claim recites a digital watermark key generation method in which the key providing security for a plural-bit message. The method comprises: providing a plural-bit seed; randomizing the plural-bit seed; using a programmed electronic processor for encoding the randomized plural-bit seed with convolutional encoding, the encoded seed comprising a key; and transforming an independent message with the key, the independent message to be used in a digital watermark encoding process. Of course, other claims and combinations are provided too.

23 Claims, 5 Drawing Sheets

DIGITAL WATERMARK KEY GENERATION

RELATED APPLICATION DATA

This application is a division of U.S. patent application Ser. No. 11/140,540, filed May 26, 2005 (U.S. Pat. No. 8,140,848), which claims the benefit of U.S. Provisional Patent Application No. 60/585,177, filed Jul. 1, 2004.

This patent application is related to each of the following patent documents: U.S. Published Patent Application No. US 2003-0033530 A1; U.S. patent application Ser. No. 10/020,519, filed Dec. 14, 2001 (published as US 2002-0159614 A1), which claims the benefit of 60/256,627, filed Dec. 18, 2000; U.S. patent application Ser. No. 10/139,147, filed May 2, 2002 (published as US 2003-0037075 A1), which claims the benefit of 60/288,272, filed May 2, 2001; and U.S. patent application Ser. No. 09/186,962, filed Nov. 5, 1998 (U.S. Pat. No. 7,171,016), which is a continuation of U.S. patent application Ser. No. 08/649,419, filed May 16, 1996 (now U.S. Pat. No. 5,862,260).

Each of the above patent documents is hereby incorporated by reference.

TECHNICAL FIELD

The disclosure relates to digital watermarking, steganography, and specifically to watermark key generation used in conjunction with digital watermarking and steganographic encoding/decoding methods.

BACKGROUND AND SUMMARY

Digital watermarking is a process for modifying physical or electronic media signals to embed a hidden machine-readable code into the media. The media signal may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects. Steganography is related field of study pertaining to encoding and decoding of hidden auxiliary data signals, such that the auxiliary data is not discernable by a human.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking and steganographic techniques have been developed. The reader is presumed to be familiar with the literature in this field. Particular techniques for embedding and detecting auxiliary messages in media signals are detailed in the assignee's U.S. Pat. Nos. 6,122,403 and 6,614,914, which are each hereby incorporated by reference.

One practical challenge in the deployment of digital watermarking systems is the potential lack of flexibility in changing aspects of the digital watermark system once it's deployed. As system and application requirements change, there is sometimes a desire to change aspects of the digital watermark message coding protocol. For example, one might want to change the format, syntax, semantics and length of the message payload in the digital watermark. The syntax used in the protocol can include the types and sizes of message fields, as well as the symbol coding alphabet (e.g., use of binary or M-ary symbols, etc.) The semantics used in the protocol refer to the meaning of the message elements in the message payload (e.g., what the elements are interpreted to mean). While such changes may not alter the fundamental data hiding or extraction function, they present a practical difficulty because the deployed digital watermark readers may be rendered obsolete if the protocol is changed.

One potential solution is to upgrade the readers deployed in the field. However, this presents technical challenges, such as whether the readers are accessible and/or re-programmable to receive and facilitate upgrades.

The technology provides variable message protocol methods for digital watermarking. One aspect of the disclosure is a message protocol method for digital watermarking. This method forms a fixed message protocol portion having a fixed length and identifying a version of a variable protocol portion. The method also forms a variable message protocol portion having variable error robustness message coding format. The version indicates the error robustness coding format of the variable protocol portion. The fixed and variable message protocol portions are then embedded into a host media signal such that the message is substantially imperceptible in the host media signal.

Another aspect of the disclosure is a method for decoding a digital watermark having fixed and variable protocol message portions. The method extracts a hidden message code embedded in a host media signal by evaluating the host media signal to compute the hidden message code having fixed and variable message protocol portions. It performs error robustness decoding of the fixed protocol portion of the extracted message code to produce one or more message symbols representing a version identifier. Next, it interprets the version identifier to ascertain a version of variable protocol used to embed the variable protocol portion. Finally, it applies an error robustness decoding method of the version to decode message symbols of the variable message protocol portion.

Another aspect of the disclosure is a message protocol method for steganographically encoding a variable message into a media signal. This method forms a control message portion including at least one symbol that identifies the format of the variable message. It also forms a variable message according to the format. The format indicates a variable length of the variable message portion. The method produces a media signal with the variable message steganographically encoded in it such that the variable message is not discernable by a human but is readable by an automated reader. For example where the media signal is an image, a human viewer is not able to read the variable message encoded in that image because symbols in the variable message are arranged so as not to be interpretable without knowledge of the encoding format.

Further features will become apparent with reference to the following detailed description and accompanying drawings.

DETAILED DESCRIPTION

Figure 1:
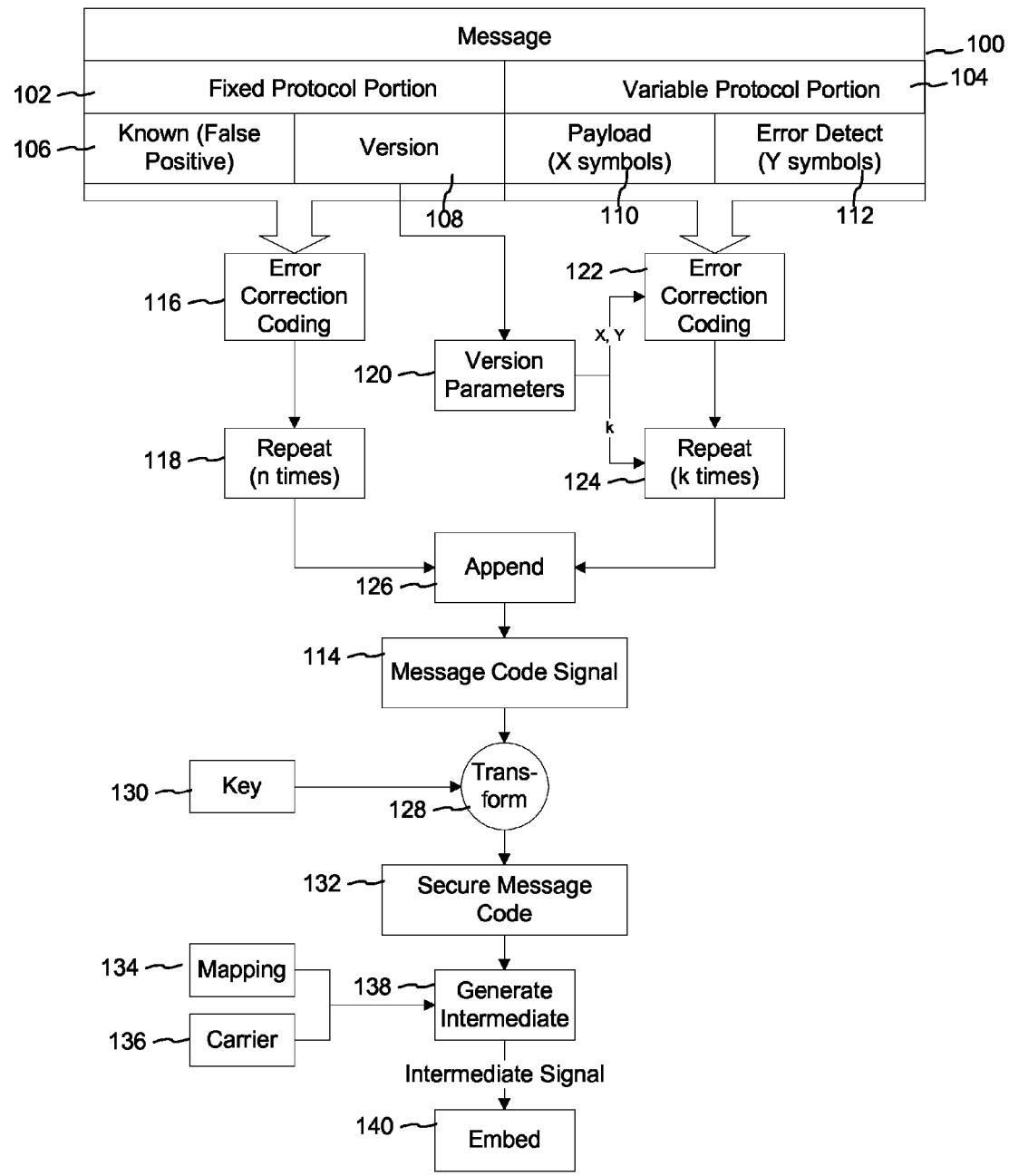
FIG. 1 is a diagram illustrating an extensible message protocol method for digital watermark embedding.

FIG. 1 is a diagram illustrating a message protocol method for digital watermark embedding. The protocol in this context refers to how the message is prepared for digital watermark embedding into a host media signal. One attribute specified by the message protocol is the error robustness coding that is applied to the message. Error robustness coding includes operations on the message that make it more robust to errors that undermine its complete and accurate recovery in potentially distorted version of the watermarked host media signal. Specific forms of error robustness coding include repetition of one or more parts of the message, and error correction coding of one or more parts of the message.

Another aspect of the message protocol is the length of the message payload. The message payload is a variable part of the message. It can be variable in both content (e.g., the values of the individual message symbols in the payload are variable), and length (e.g., the number of symbols is variable). This message payload enables the digital watermark system to convey unique information per watermarked item, such as an item ID, a transaction ID, a variable ASCII character message, etc.

A related aspect of the message protocol is the syntax and semantic meaning of the message elements. As the length of the payload is increased or decreased, the fields within that payload may change, as well as the semantic meaning of the fields. For example, the first N binary symbols may represent a unique ID, while the next M bits represent a source ID or hash of the object in which the information is embedded. As N and M change and other fields are added or deleted, the syntax and semantic meaning of symbols in the payload change.

Yet another aspect of the protocol is the extent to which it facilitates digital watermarking systems that have different message protocols, yet are backward and/or forward compatible with each other. Backward compatibility refers to the case where new versions of the digital watermark reader are able to read messages using the most recently released protocol version, as well as messages in every prior protocol version. Forward compatibility refers to the case where a current version of the digital watermark reader is able to read messages compatible with subsequently released protocol versions. Further examples illustrating this aspect of the protocol follow later.

The method illustrated in FIG. 1 operates with many different forms of digital watermark embedding and detecting operations. In other words, regardless of how the host media signal is modified to embed the result of the message protocol (referred to as the intermediate signal), the message protocol method is widely applicable.

The method of FIG. 1 also operates on different host media signal types and formats. For the sake of illustration, we will use examples of still image watermark embedding that are extendable to other media types, such as motion images (e.g., video) and audio. The method is implemented in software and operates on blocks of the host media signal of a fixed size. These blocks are typically much smaller than the overall size of the host signal, and as such, are tiled or otherwise repeated throughout the host signal to provide an additional layer of robustness beyond the robustness coding within each block.

Since the blocks are of fixed size in our example implementation, there are trade-offs between the length of the variable message payload and the extent of redundancy that may be employed to map that variable message payload into the host media signal of fixed size.

As shown in FIG. 1, the message 100 has a fixed protocol portion 102 and a variable protocol portion 104. The fixed protocol portion includes a fixed message part 106, and a variable message part 108. Each of the parts of the fixed protocol portion has a fixed length, and employs a fixed error robustness coding method. The fixed message part includes a fixed set of known message symbols that serve as a test for false positives (e.g., provide a check to ensure a valid digital watermark is present).

The variable part carries a version identifier 108. This version identifier may carry version parameters, such as an error correction type identifier, a repetition indicator, an error detect indicator or an index that refers to the type of error correction, error detection, and/or repetition applied in the variable protocol portion 104. The variable part of the fixed protocol varies so as to indicate the version of the variable protocol used in processing the variable protocol portion.

The variable protocol portion 104 includes a variable payload part 110 and an error detect part 112. As noted earlier, the payload has a variable number of symbols (X) as specified by the version. The protocol employs a form of error detection, such as a certain type and length of Cyclic Redundancy Check symbols. The variable message protocol portion, therefore, includes a number of error detect symbols (Y).

The message protocol method generates a message code signal 114 by performing error robustness coding on the fixed and variable protocol portions. In the case of the fixed protocol, the method uses a fixed error correction coding method 116 followed by fixed repetition 118 of the resulting message a predetermined number of times (n). While the diagram shows error correction followed by repetition coding, the error robustness coding of the fixed portion may include error correction and/or repetition coding. Examples of error correction coding include block codes (e.g., BCH, Reed Solomon, etc.), convolution codes, turbo codes or combinations thereof.

The version parameters 120 in the illustrated example specify the payload and error detection part lengths, and number of repetitions of the variable portion or individual parts of the variable portion. They may also specify the type of error correction coding to be applied, such as block codes, convolution codes, concatenated codes, etc. As explained further below, some forms of error correction, such as convolution codes, perform error correction in a manner that depends on subsequent symbols in the message symbol string. As such, symbols at the end of the string are error correction decoded with less confidence because there are fewer or no symbols following them. This attribute of error correction coding schemes that have "memory" can be mitigated by repeating parts of the message symbol string that are more susceptible to errors due to the lack of memory than other parts of the message symbol string. As noted, this typically leads to repetition of the tail of the string more than the beginning of the string.

According to the version parameters 120, the protocol method applies a selected error correction coding 122 to the symbols of the variable portion 104, and then applies repetition coding 124 to one or more parts of the error correction coded symbols.

The protocol method then appends 126 the robustness coded fixed and variable portions to form a message code signal 114.

For added security in some applications, the method transforms (128) the message code signal with a secret key. This transformation may include a vector XOR or matrix multiplication of a key 130, such as pseudorandom number that is sufficiently independent from other like key numbers, with the message code signal. The key may be a seed number to a pseudorandom sequence generator, an index to a look up table that produces a vector or matrix, or a vector/matrix, etc. The key serves the function of making the digital watermark unreadable to anyone except those having the proper key. The use of this key enables the digital watermarking protocol to be used for several entities wishing to privately embed and read their own digital watermarks, through the use of their own keys.

The result of the transformation by the key 130 is the secure message code 132. Our example implementation applies an additional transformation to the secure message code before embedding it into the host media signal block. In particular, a mapping function 134 maps elements of the secure message code vector to elements of the host signal block. The elements of the host signal block may be characteristics of individual samples (luminance of pixels or frequency coefficients), or characteristics of groups of samples (statistical features). The carrier signal function 136 transforms the message code elements as a function of corresponding elements of a carrier signal. One such example is spread spectrum modulation of the secure message code with a carrier signal. The carrier signal may have attributes that increase robustness of the watermark (message spreading and scattering as an anti-jamming mechanism), and facilitate detection and geometric synchronization (e.g., autocorrelation properties). The result of transformation by the carrier and mapping functions 138 is an intermediate signal. A digital watermark embedder 140 then modifies characteristics of elements of the host media signal block according to the elements of the intermediate signal to hide the intermediate signal in the host media signal block. There are a wide variety of such embedding methods that may be employed, including those discussed in the documents incorporated by reference. Where perceptual artifacts are a concern, human perceptual modeling may be employed to reduce the perceptibility of artifacts caused by modifying the host media signal block according to the intermediate signal.

We return to a discussion of key 130 generation. Watermarking applications are anticipated to provide services to a large number of different customers. In some settings, it is preferably for one customer not to be able to read or embed another customer's watermark. Furthermore, a single "keyed-protocol" which defines a large number of different sub-protocols may be desirable. Each of the different sub-protocols is preferably uniquely specified by a key, so that each customer can be given their own sub-protocol key. We refer to a set of keys used to define the sub-protocols as a keyspace. The keyed-protocol preferably satisfies at least two related parameters: a non-interference parameter, and a security parameter. The non-interference parameter helps ensure that a watermark encoded using one key (and corresponding sub-protocol) is not readable using a different key (and corresponding sub-protocol). The security parameter helps prevents one customer from guessing another customer's key.

We have determined that a keyspace can be designed by utilizing techniques associated with error correcting codes (ECCs). For a given keyspace design we can identify a corresponding error correcting code design; moreover, good error correcting code designs will tend to provide correspondingly good keyspace designs.

Suppose, for example, that we would like to have a keyspace including $2^{16}$ keys. If we desire to have each resulting, transformation key be, e.g., 1024 bits in length, we draw an analogy between a keyspace and an error correcting code that takes 16 bit words as input and produces output words of length 1024 bits. The ECC has $2^{16}$ possible output words (one for each of the possible input words), and these output words are a set of keys in the keyspace. A good ECC preferably will maximize the distance (e.g., hamming distance) between its codewords in order to provide resilience to errors.

There are many different types of ECCs, and each is specialized to certain types of applications. Some are designed to withstand bursts of correlated errors, and some work best on channels with random errors. In our case, we would like a keyspace based upon an ECC that handles random errors well, since we would expect key mismatch to be a random phenomenon. Another aspect of error correcting codes is called code rate. The rate of an error correcting code is a ratio of a number of bits input to a number of bits output. High rates are considered to be >1/2, and typical low rate codes are 1/3 and 1/4. An illustrative implementation, discussed below utilizes convolutional codes. However, we note that other error correcting codes (e.g., BCH, Reed Solomon, etc.) can be used for key generation as well.

Onto the illustrative examples.

By combining two or more convolutional coders in a serial concatenation arrangement, we can construct a larger convolutional coder with a rate equal to the product of the rates of the component convolutional coders.

Figure 5A:
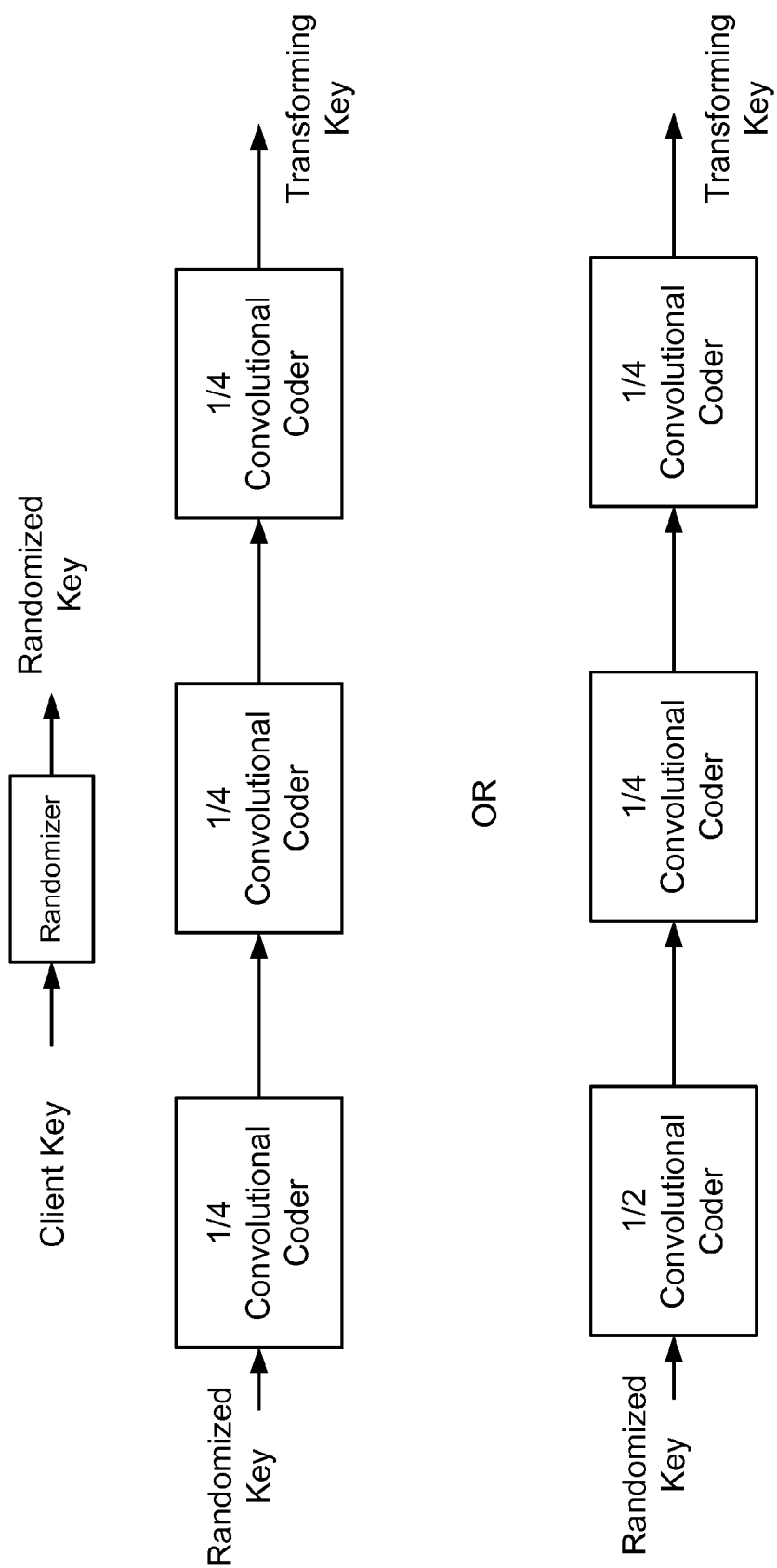
FIGS. 5A and 5B are diagrams illustrating watermark key generation.

FIG. 5A illustrates two examples of concatenated convolutional coders. By concatenating various combinations of these codes, we can construct concatenated coders with a variety of rates. If, for example, we concatenate three coders with rates 1/4, 1/4, and 1/4, the resulting combined rate is 1/64. (Or, for each bit input, the concatenated coders output 64 bits.) A 8-bit input yields a 512-bit output, a 16-bit input yields a 1024-bit output, and a 20-bit input yields a 1,280-bit output, and so on. An alternative coding scheme comprises concatenate three codes with rates of 1/2, 1/4, and 1/4, the resulting combined rate is 1/32. An 8-bit input yields a 256-bit output, and so on.

An initial key (e.g., an 8, 16 or 20-bit key word assigned to a particular client or customer) is provided. The initial key is preferably randomized, e.g., through a pseudorandom or random randomizer. There are many possible randomizers, including, e.g., a linear feedback shift register which are know in the art. Of course, there are many other randomizers known that can be used with the present technology. The randomized key is provided as input for encoding (e.g., provided as input to one of the serial combinations of convolutional coders shown in FIG. 5A).

Figure 5B:
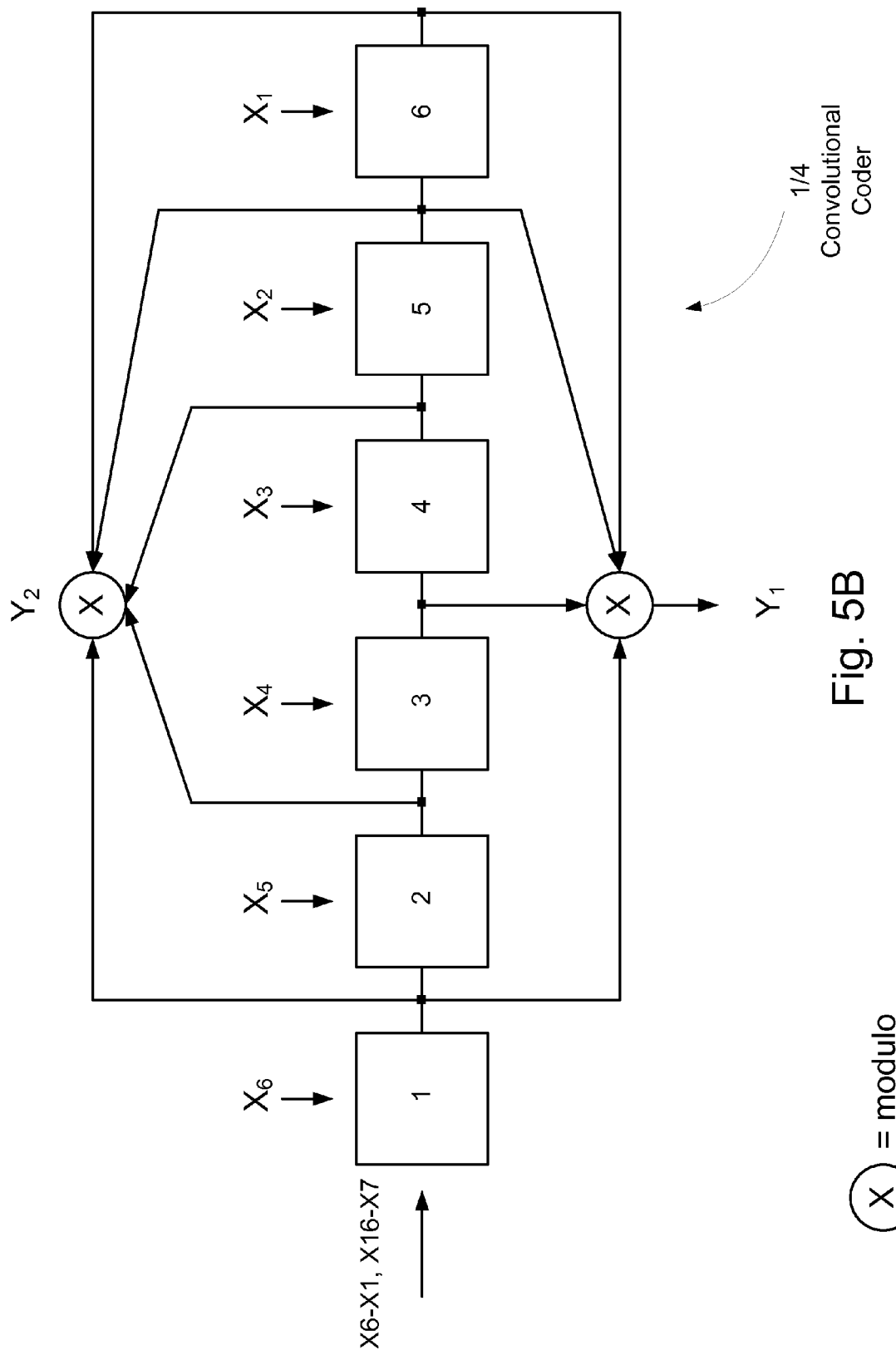

A 1/4 rate convolutional coder is shown in FIG. 5B. The coder preferably includes shift-registers, which are clocked to produce 4-bits of output (Y1, Y2, Y3, Y4) for each bit of input ($X_N$). The first two output stages are shown, and correspond with Table 1, below. The other two output stages are easily envisioned with reference to Table 1 and FIG. 5B. While the coder is shown as expecting a 16-bit input, the present invention is not so limited. Indeed, we may prefer an 8, 12, 20 or 36-bit input value, etc.

TABLE 1

Four-bit output per one-bit input, relative to respective register taps.

| Register 1 | Register 2 | Register 3 | Register 4 | Register 5 | Register 6 | Output |
|---|---|---|---|---|---|---|
| 1 | 0 | 1 | 0 | 1 | 1 | $Y_1$ |
| 1 | 1 | 0 | 1 | 1 | 1 | $Y_2$ |
| 1 | 1 | 1 | 0 | 0 | 1 | $Y_3$ |
| 1 | 1 | 1 | 1 | 0 | 1 | $Y_4$ |

There are many different configurations for a convolutional coder, and various different rate coders are suitably interchangeable with the present technology. For example, many coders include more or less registers and more or less logic (e.g., modulo-2 or AND gates) to combine the input values to achieve a particular encoding scheme. Here we have shown a simplistic coder to ease discussion.

Also illustrated in FIG. 5B is a so-called tail-biting convolution code. (Convolutional codes are meant to be used for large blocks or strings of data, and become less efficient with smaller blocks or strings of data. An efficiency loss is caused since data bits at an end of the input string have less impact on output bits than do data bits at a beginning of the input string. One type of convolutional code which is designed to circumvent this problem is a tail-biting convolutional code.) To help ensure that the ending bits of an initial key are fully utilized in a resulting transforming code, we preferably "pre-load" (or initialize) the shift-registers with some of the first string bits (here, by way of illustration only, we have illustrated pre-loading the first 6-bits). The first input to shift register 1 is X7, followed by X8-X16. We include the first six bit values, X1-X6, at the end of the input string. This coding structure helps to ensure that the end bit values have an impact on a resulting code.

A resulting transforming key (FIG. 5A) is used to help transform (128) a message code signal. The key serves a function of making a digital watermark message un-readable to anyone except those having the proper key. The use of this key enables a digital watermarking protocol to be used for several entities wishing to privately embed and read their own digital watermarks, through the use of their own message key.

While we have illustrated this message transformation with respect to digital watermarking and steganographic encoding, the message generation can be used with other machine-readable codes as well (e.g., 2D-symbologies, 2D barcodes, etc.).

Figure 2:
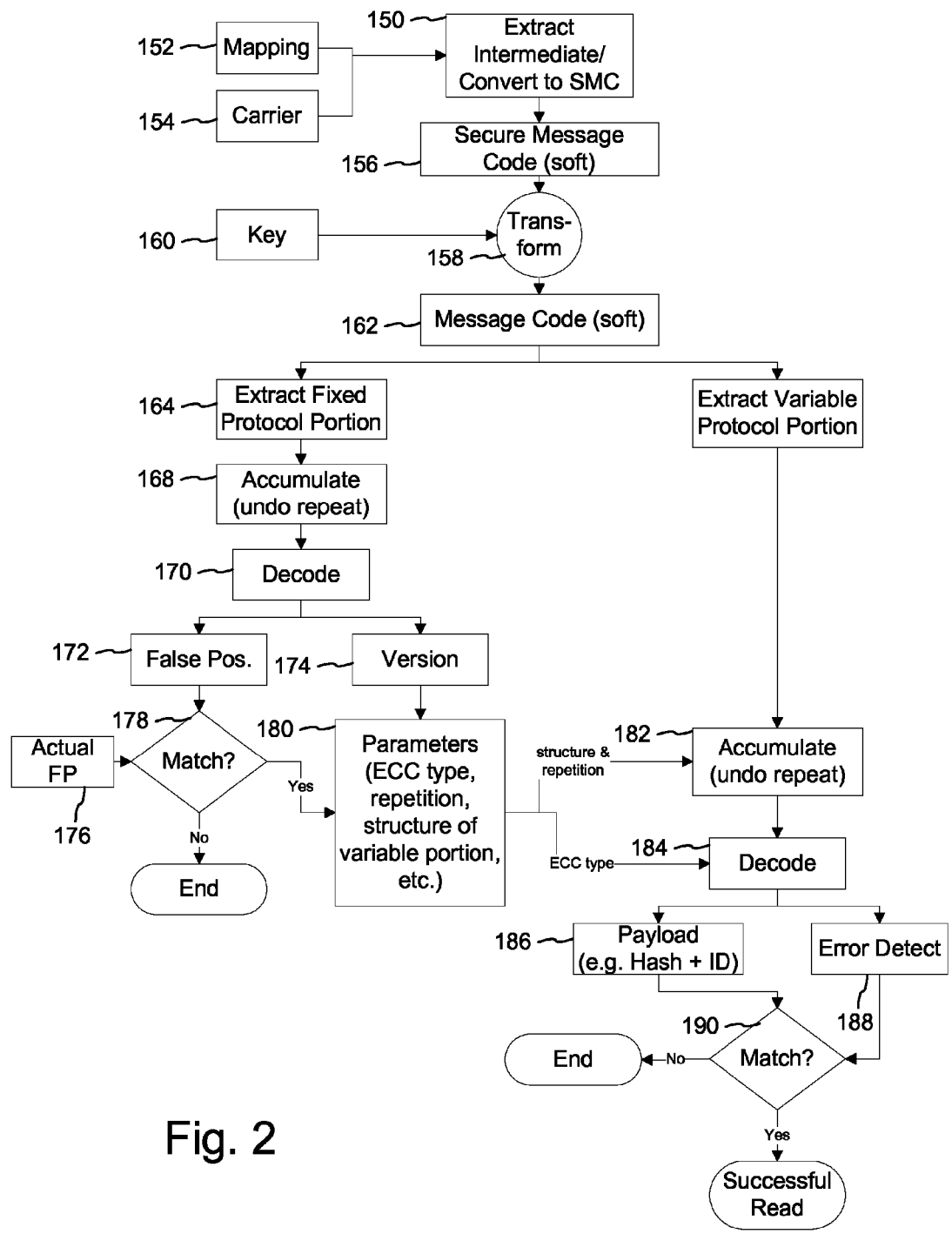
FIG. 2 is a diagram illustrating a method of extracting a digital watermark message from a host media signal that has been embedded using the method of FIG. 1.

FIG. 2 is a diagram illustrating a method of extracting a digital watermark message from a host media signal that has been embedded using the method of FIG. 1. This method is implemented in a software implementation of a digital watermark reader. The reader extracts estimates of values for the intermediate signal from the host, using a reader 150 compatible with the embedder 140 of FIG. 1. This process may be performed after filtering, synchronizing and generating blocks of the host media signal. In our implementation, the reader 150 extracts estimates of the intermediate signal elements. It then uses the mapping function 152 and carrier signal 154 to convert elements of the intermediate signal embedded in each host media signal block to soft estimates of the secure message code. These elements are soft estimates derived from aggregating elements from the intermediate signal estimate for each corresponding element of the secure message code 156 according to the mapping and carrier functions. In particular, each soft message code element represents a value between S, and −S, where S represents an integer corresponding to binary symbol 1, and −S represents the negative integer corresponding to binary symbol 0.

Next, the reader transforms (158) the secure message code estimate with the key 160. This operation reverses the key transformation 128 applied to the message code in the embedder of FIG. 1. The result is a message code signal estimate, which includes the fixed and variable message protocol portions. The reader extracts these portions (164, 166) and proceeds to apply the fixed protocol to decode the error robustness coding of the fixed protocol portion. This entails accumulation 168 of the repeated message symbols, followed by error correction decoding 170.

The result of the error correction decoding includes a set of fixed symbols (the false positive symbols) 172, and the version identifier 174. The reader compares the extracted fixed symbols with the actual fixed symbols 176, and if there is a match 178, then the version identifier is deemed to be accurate. The reader interprets the version identifier to get the version parameters 180, such as the error correction coding type for the variable protocol, the repetition parameters, the structure of the variable protocol portion, etc. The version parameters may be carried within the version identifier directly or may be accessed via a look-up operation, using the version identifier as an index.

With this version information, the reader proceeds to decode the error robustness coding of the variable protocol portion. This decoding entails, for example, accumulation 182 of the repeated symbols to undo the repetition coding, along with error correction decoding 184 according to the version information. The result of the decoding includes the payload 186 and error detection symbols 188. The reader applies the error detection method to the payload and compares 190 with the error detection symbols to confirm the accuracy of the payload information.

This protocol portion enables the watermarking system to be backward and forward compatible. It is backward compatible because each new version of watermark detector may be programmed to read digital watermarks embedding according to the current version and every prior version of the protocol. It can be forward compatible too by establishing version identifiers and corresponding protocols that will be used in future versions of the system. This enables watermark detectors deployed initially to read the current version of the protocol, as well as future versions of the protocol as identified in the version identifier. At the time of embedding a particular media signal, a digital watermark embedder embeds a version identifier of the protocol used to embed the variable protocol portion. At the time of reading the digital watermark, a reader extracts the version identifier to determine the protocol of the variable protocol portion, and then reads the message payload carried in the variable protocol portion.

Another embodiment of a digital watermarking protocol is described in U.S. Pat. No. 5,862,260, which is incorporated by reference. In this protocol, the digital watermark message includes a control message protocol portion and a variable message protocol portion. The control message includes control symbols indicating the format and length of the variable message protocol portion. The control message protocol and the variable message protocol include symbols that are mapped to locations within a block of the host signal called a "signature" block. As the length of the variable message portion increases, the redundancy of the control message portion decreases.

U.S. Pat. No. 5,862,260 describes a variety of digital watermark embedding methods. One such class of methods for images and video increments or decrements the values of individual pixels, or of groups of pixels (bumps), to reflect encoding of an auxiliary data signal combined with a pseudo random noise signal. One variation of this approach is to embed the auxiliary data—without pseudo randomization—by patterned groups of pixels, termed "bit cells."

Figure 3A:
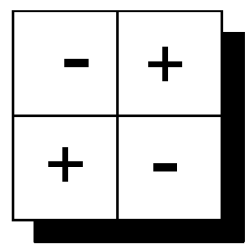
FIGS. 3A and 3B show examples of bit cells used in one form of digital watermark embedding.
Figure 3B:
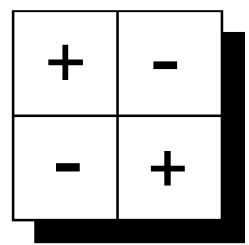

Referring to FIGS. 3A and 3B, two illustrative 2×2 bit cells are shown. FIG. 3A is used to represent a "0" bit of the auxiliary data, while FIG. 3B is used to represent a "1" bit. In operation, the pixels of the underlying image are tweaked up or down in accordance with the +/− values of the bit cells to represent one of these two bit values. The magnitude of the tweaking at any given pixel, bit cell or region of the image can be a function of many factors, including human perceptibility modeling, non-linear embedding operations, etc. as detailed in U.S. Pat. No. 5,862,260. In this case, it is the sign of the tweaking that defines the characteristic pattern. In decoding, the relative biases of the encoded pixels are examined using techniques described above to identify, for each corresponding region of the encoded image, which of the two patterns is represented.

While the auxiliary data is not explicitly randomized in this embodiment, it will be recognized that the bit cell patterns may be viewed as a "designed" carrier signal.

The substitution of a pseudo random noise carrier with a "designed" information carrier affords an advantage: the bit cell patterning manifests itself in Fourier space. Thus, the bit cell patterning can act like the subliminal digital graticules discussed in U.S. Pat. No. 5,862,260 to help register a suspect image to remove scale/rotation errors. By changing the size of the bit cell, and the pattern therein, the location of the energy thereby produced in the spatial transform domain can be tailored to optimize independence from typical imagery energy and facilitate detection.

While the foregoing discussion contemplates that the auxiliary data is encoded directly—without randomization by a PRN signal, in other embodiments, randomization can of course be used.

Figure 4:
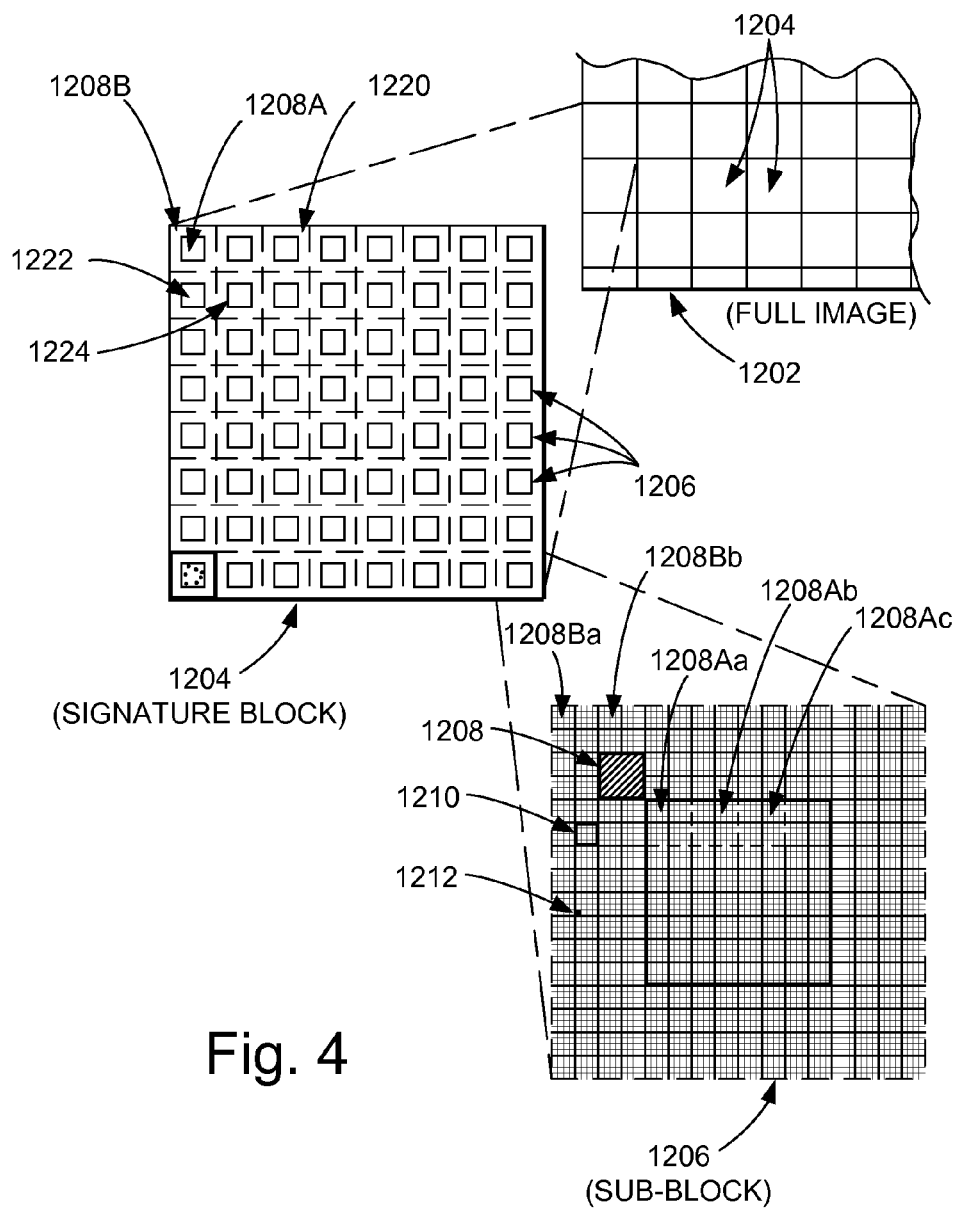
FIG. 4 shows a hierarchical arrangement of signature blocks, sub-blocks, and bit cells used in one implementation of a digital watermark message protocol.

FIG. 4 illustrates an example of a digital watermarking protocol having a message control portion and a variable portion. While this protocol is illustrated using an image, it applies to other media types and digital watermark embedding/reading systems.

Referring to FIG. 4, an image 1202 includes a plurality of tiled "signature blocks" 1204. (Partial signature blocks may be present at the image edges.) Each signature block 1204 includes an 8×8 array of sub-blocks 1206. Each sub-block 1206 includes an 8×8 array of bit cells 1208. Each bit cell comprises a 2×2 array of "bumps" 1210. Each bump 1210, in turn, comprises a square grouping of 16 individual pixels 1212.

The individual pixels 1212 are the smallest quanta of image data. In this arrangement, however, pixel values are not, individually, the data carrying elements. Instead, this role is served by bit cells 1208 (i.e. 2×2 arrays of bumps 1210). In particular, the bumps comprising the bits cells are encoded to assume one of the two patterns shown in FIG. 3. As noted earlier, the pattern shown in FIG. 3A represents a "0" bit, while the pattern shown in FIG. 3B represents a "1" bit. Each bit cell 1208 (64 image pixels) thus represents a single bit of the embedded data. Each sub-block 1206 includes 64 bit cells, and thus conveys 64 bits of embedded data.

The nature of the image changes effected by the encoding follows the techniques set forth in U.S. Pat. No. 5,862,260 under the heading MORE ON PERCEPTUALLY ADAPTIVE SIGNING.

In the illustrated embodiment, the embedded data includes two parts: control bits and message bits. The 16 bit cells 1208A in the center of each sub-block 1206 serve to convey 16 control bits. The surrounding 48 bit cells 1208B serve to convey 48 message bits. This 64-bit chunk of data is encoded in each of the sub-blocks 1206, and is repeated 64 times in each signature block 1204.

A digression: in addition to encoding of the image to redundantly embed the 64 control/message bits therein, the values of individual pixels are additionally adjusted to effect encoding of subliminal graticules through the image. In this embodiment, the graticules discussed in conjunction with FIG. 29A in U.S. Pat. No. 5,862,260 are used, resulting in an imperceptible texturing of the image. When the image is to be decoded, the image is transformed into the spatial domain, a Fourier-Mellin technique is applied to match the graticule energy points with their expected positions, and the processed data is then inverse-transformed, providing a registered image ready for decoding (see U.S. Pat. No. 5,862,260). The sequence of first tweaking the image to effect encoding of the subliminal graticules, or first tweaking the image to effect encoding of the embedded data, is not believed to be critical. As presently practiced, the local gain factors (discussed in U.S. Pat. No. 5,862,260) are computed; then the data is encoded; then the subliminal graticule encoding is performed. Both of these encoding steps make use of the local gain factors.

Returning to the data format, once the encoded image has been thus registered, the locations of the control bits in sub-block 1206 are known. The image is then analyzed, in the aggregate (i.e. considering the "northwestern-most" sub-block 1206 from each signature block 1204), to determine the value of control bit #1 (represented in sub-block 1206 by bit cell 1208Aa). If this value is determined (e.g. by statistical techniques of the sort detailed above) to be a "1," this indicates that the format of the embedded data conforms to the standard detailed herein. According to this standard, control bit #2 (represented by bit cells 1208Ab) is a flag indicating whether the image is copyrighted. Control bit #3 (represented by bit cells 1208Ac) is a flag indicating whether the image is unsuitable for viewing by children. Certain of the remaining bits are used for error detection/correction purposes.

The 48 message bits of each sub block 1206 can be put to any use; they are not specified in this format. One possible use is to define a numeric "owner" field and a numeric "image/item" field (e.g. 24 bits each).

If this data format is used, each sub-block 1206 contains the entire control/message data, so same is repeated 64 times within each signature block of the image.

If control bit #1 is not a "1," then the format of the embedded data does not conform to the above described standard. In this case, the reading software analyzes the image data to determine the value of control bit #4. If this bit is set (i.e. equal to "1"), this signifies an embedded ASCII message. The reading software then examines control bits #5 and #6 to determine the length of the embedded ASCII message.

If control bits #5 and #6 both are "0," this indicates the ASCII message is 6 characters in length. In this case, the 48 bit cells 1208B surrounding the control bits 1208A are interpreted as six ASCII characters (8 bits each). Again, each sub-block 1206 contains the entire control/message data, so same is repeated 64 times within each signature block 1204 of the image.

If control bit #5 is "0" and control bit #6 is "1," this indicates the embedded ASCII message is 14 characters in length. In this case, the 48 bit cells 1208B surrounding the control bits 1208A are interpreted as the first six ASCII characters. The 64 bit cells 1208 of the immediately-adjoining sub-block 1220 are interpreted as the final eight ASCII characters.

Note that in this arrangement, the bit-cells 1208 in the center of sub-block 1220 are not interpreted as control bits. Instead, the entire sub-block serves to convey additional message bits. In this case there is just one group of control bits for two sub-blocks.

Also note than in this arrangement, pairs of sub-blocks 1206 contains the entire control/message data, so same is repeated 32 times within each signature block 1204 of the image.

Likewise if control bit #5 is "1" and control bit #6 is "0." This indicates the embedded ASCII message is 30 characters in length. In this case, 2×2 arrays of sub-blocks are used for each representation of the data. The 48 bit cells 1208B surrounding control bits 1208A are interpreted as the first six ASCII characters. The 64 bit cells of each of adjoining block 1220 are interpreted as representing the next 8 additional characters. The 64 bits cells of sub-block 1222 are interpreted as representing the next 8 characters. And the 64 bit cells of sub-block 1224 are interpreted as representing the final 8 characters. In this case, there is just one group of control bits for four sub-blocks. And the control/message data is repeated 16 times within each signature block 1204 of the image.

If control bits #5 and #6 are both "1's", this indicates an ASCII message of programmable length. In this case, the reading software examines the first 16 bit cells 1208B surrounding the control bits. Instead of interpreting these bit cells as message bits, they are interpreted as additional control bits (the opposite of the case described above, where bit cells normally used to represent control bits represented message bits instead). In particular, the reading software interprets these 16 bits as representing, in binary, the length of the ASCII message. An algorithm is then applied to this data (matching a similar algorithm used during the encoding process) to establish a corresponding tiling pattern (i.e. to specify which sub-blocks convey which bits of the ASCII message, and which convey control bits.)

In this programmable-length ASCII message case, control bits are desirably repeated several times within a single representation of the message so that, e.g., there is one set of control bits for approximately every 24 ASCII characters. To increase packing efficiency, the tiling algorithm can allocate (divide) a sub-block so that some of its bit-cells are used for a first representation of the message, and others are used for another representation of the message.

Reference was earlier made to beginning the decoding of the registered image by considering the "northwestern-most" sub-block 1206 in each signature block 1204. This bears elaboration.

Depending on the data format used, some of the sub-blocks 1206 in each signature block 1204 may not include control bits. Accordingly, the decoding software desirably determines the data format by first examining the "northwestern-most" sub-block 1206 in each signature block 1204; the 16 bits cells in the centers of these sub-blocks will reliably represent control bits. Based on the value(s) of one or more of these bits (e.g. the Digimarc Beta Data Format bit), the decoding software can identify all other locations throughout each signature block 1204 where the control bits are also encoded (e.g. at the center of each of the 64 sub-blocks 1206 comprising a signature block 1204), and can use the larger statistical base of data thereby provided to extract the remaining control bits from the image (and to confirm, if desired, the earlier control bit(s) determination). After all control bits have thereby been discerned, the decoding software determines (from the control bits) the mapping of message bits to bit cells throughout the image.

To reduce the likelihood of visual artifacts, the numbering of bit cells within sub-blocks is alternated in a checkerboard-like fashion. That is, the "northwestern-most" bit cell in the "northwestern-most" sub-block is numbered "0." Numbering increases left to right, and successively through the rows, up to bit cell 63. Each sub-block diametrically adjoining one of its corners (i.e. sub-block 1224) has the same ordering of bit cells. But sub-blocks adjoining its edges (i.e. sub-blocks 1220 and 1222) have the opposite numbering. That is, the "northwestern-most" bit cell in sub-blocks 1220 and 1222 is numbered "63." Numbering decreases left to right, and successively through the rows, down to 0. Likewise throughout each signature block 1204.

In a variant of this format, a pair of sub-blocks is used for each representation of the data, providing 128 bit cells. The center 16 bit cells 1208 in the first sub-block 1206 are used to represent control bits. The 48 remaining bit cells in that sub-block, together with all 64 bit cells 1208 in the adjoining sub-block 1220, are used to provide a 112-bit message field. Likewise for every pair of sub-blocks throughout each signature block 1204. In such an arrangement, each signature block 1204 thus includes 32 complete representations of the encoded data (as opposed to 64 representations in the earlier-described standard). This additional length allows encoding of longer data strings, such as a numeric IP address (e.g., URL).

Obviously, numerous alternative data formats can be designed. The particular format used can be indicated to the decoding software by values of one or more control bits in the encoded image.

From the foregoing examples, there are a variety of ways to implement variable message protocols. In one approach having a fixed and variable message protocol, the fixed protocol portion is mapped to a fixed part of the host signal, and does not vary in length. In another approach, the number of locations in the host signal used to represent the message control portion decrease as the length of the variable message increases. The control portion may remain fixed, as in the first case, even if the variable message varies in length, by varying the repetition/error correction coding applied to the variable message portion.

Use of Variable Repetition with Error Correction Coding

U.S. patent application Ser. No. 10/020,519 (published as US 2002-0159614 A1) by Bradley and Brunk explained that the tail of a convolutionally coded message is more error prone than the rest of the message. One way to make the tail more robust to errors is apply a block error correction code, such as a BCH or other block error correction code, to the tail portion of the message. In this approach, the encoder applies block error correction coding to all, or just the tail of a message sequence, and then follows with convolutional coding of the resulting message sequence. The decoder then reverses this process, effectively using the block error correction to correct errors in the tail of the message.

U.S. patent application Ser. No. 10/139,147, filed May 2, 2002 (published as US 2003-0037075 A1) discusses the use of repetition and error correction coding. One way to compensate for the errors in the tail of a convolutionally coded message is to use repetition coding, where symbols of the convolutionally coded message are repeated, and specifically repeated in a variable fashion. The message symbols of the error correction coded message that are more prone to error, such as the tail symbols of the message in a convolutionally coded message, are repeated more than symbols at the beginning or middle of the message.

These approaches extend generally to error correction coding schemes with memory, where lack of memory at a part of the message makes that part more error prone. In particular, selective block coding or variable repetition coding of the error prone part improves the error robustness of the digital watermark message. Block error correction codes, unlike convolutional codes, do not have memory. Memory refers to the attribute of the coding method where subsequent symbols are used to correct errors in previous symbols. Variable repetition coding may be performed on individual error correction coded symbols, or blocks of such symbols. Preferably, more error prone symbols are repeated more than less error prone, error correction coded symbols.

Another way to address the error prone tail part of a convolutionally coded message is to use tail biting codes, where the tail of the coded message loops around to the head or start of the coded message. Such tail biting codes may suffer from being too computationally complex relative to the improvement in error robustness that they can provide.

Returning to the specific approach of using variable repetition, we have experimented with a number of variable repetition assignments for error correction coded symbols of digital watermark messages. A programmatic process generates the assignments from a curve that represents the repetition per symbol position over a sequence of message symbols in a digital watermark message from the start of the message to its end or "tail." Our experiments show that a variable repetition curve approximating a tan hyperbolic function, comprising constant repetition rate per symbol followed by an increasing repetition rate per symbol, and ending in a constant repetition rate, provides improved error robustness relative to the use of a constant repetition rate throughout the error correction encoded message.

Further experiments show that a variable repetition curve, starting with a constant repetition rate for the beginning of the message, and concluding with a linear increase in the repetition rate at the middle to end of the message also provides improved error robustness.

These curves may be approximated with a staircase shaped curve comprising segments of constant repetition rates at different levels of repletion. In some implementations, these stair case approximations are convenient because they facilitate the use of scrambling/encryption of the output of the repetition coder, and also facilitate decoding of a digital watermark message with fixed and variable protocol portions as described above.

The effect of this approach is to set a variable signal to noise for the error correction coded symbols through variable repetition rates of those symbols. Relative to constant repetition rate coding of error correction coded symbols, this approach achieves a lower effective error rate for the same signal to noise ratio of the digital watermark message signal.

Automated and/or programmatic methods may be used to find optimized variable repetition curves for a given digital watermark message model. Our experience shows that the errors introduced by the digital watermarking channel on the error correction coded message are approximated by white gaussian noise. As such, our programmatic processes model the channel, and use general parameters defining characteristics of the curve, to compute the repetition rate per error correction coded symbol that achieves preferred error robustness.

The first step in formulating a repetition rate per symbol curve involves choosing an appropriate model. It is not a requirement to choose a parametric model, but it is a convenience. The principle basis for consideration of a model is that it is monotonically increasing. Further, it should allow flexibility in tuning the initial point of repetition increase as well as the rate of increase, which may or may not be constant. We, for example, have found that both the hyperbolic tangent and the piece-wise linear constant model behave satisfactorily.

Once a model is chosen it remains to vary its parameters until the best behavior in terms of minimum error rate is found. Specifically, if one can model the noise characteristics of the digital watermark message at the input to the convolutional decoder, it is desirable to run many simulations with pseudo-randomly generated noise in order to determine how the model and corresponding choice of parameters behave. If a slight perturbation in the model parameters produces a better simulation effect (e.g., lower error rate), we continue to adjust the parameters in the direction of the perturbation. One programmatic process for converging on an optimized result is a gradient-descent procedure. The model parameters are adjusted using such a procedure, according to perturbation and simulation re-evaluation, until a minimum in the error rate is achieved. In order to avoid problems with local minima on the optimization surface and/or simulation noise, one may wish to perform the search using several different initial parameter configurations. It should be noted that for all choices of models and corresponding parameters, the total number of repetitions should remain fixed. In other words, the area under the repetition curve is constant.

Extensions

The above concepts of protocols with variable robustness coding may be extended to optimize auxiliary data coding applications, including digital watermarking. Generally stated, the approach described in the previous section uses variable robustness coding to reduce the error rate in more error prone parts of a steganographic message. One specific form of variable robustness coding is variable repetition coding of more error prone parts of an error correction coded message.

One variation of this approach is to analyze a model of the channel and/or the host media signal that is communicated through that channel to determine locations within the steganographic code (e.g., embedding locations of a digital watermark) that are likely to be more error prone. In these locations, the steganographic encoding process uses a more robust message coding scheme than in other locations that are less error prone. One specific example is to subdivide the host media signal, such as an image, video frame or audio file into blocks, such as the contiguous tiles described above. Then, the embedder measures the expected error rate for each block, and applies an amount of error robustness coding to the steganographic code mapped to that block corresponding to the expected error rate. Higher error rate blocks have a greater amount of robustness coding, such as more repetition per message symbol. For example, for fixed sized tiles, the error robustness coding increases, resulting in fewer message symbols in the block, but at a higher error robustness level.

The measurement of expected error rate can be modeled based on a model of the channel and/or model of the host signal. For example, the host signal may have certain properties that make the steganographic code embedded in it more error prone for a particular channel. For example, an image that has less variance or energy in a block may be more error prone for a distortion channel that includes printing, scanning, and/or compression. As such, a measure of the variance in the block provides an indicator of the error rate, and thus, an indicator of the type of error robustness coding that need by applied to reduce the error rate. The error robustness, such as the extent of repetition coding or strength of the error correction code is selected to correspond to the desired error rate for the block.

One challenge in supporting such variable robustness coding within blocks of a host signal is the extent to which the auxiliary data decoder (e.g., digital watermark reader) is able to interpret variable robustness coding. This can be addressed by using a message protocol with fixed and variable protocol portions, where the fixed portion in each block specifies the type of error robustness coding used for that block. Alternatively, if the embedder uses a robust measure of achievable capacity for a given error rate, it is possible to determine the amount and/or type of robustness coding that was used at the encoder by observing the data at the auxiliary data decoder. In this way, the decoder can exploit what it knows about the channel, namely, the received host signal carrying the auxiliary data (e.g., an image carrying a digital watermark) and supposed processing noise, in the same fashion that it was exploited at the embedder of the auxiliary data. In particular, if the measure of the expected error rate is likely to be the same at the embedder and the decoder, even after distortion by the channel and the embedding of the auxiliary data, then the decoder can simply re-compute the expected error rate at the receiver, and use this measure to determine the type of error robustness coding that has been applied. In another words, a part of the auxiliary data need not be allocated to identifying the type of error robustness coding if the decoder can derive it from the received signal, the channel, and/or other information available to it.

Concluding Remarks

Having described and illustrated the principles of the technology with reference to specific implementations, it will be recognized that the technology can be implemented in many other, different, forms. The variable message coding protocols may be used in digital watermarking applications where digital watermarks are embedded by imperceptibly modifying a host media signal. They may also be used in steganographic applications where message are hidden in media signals, such as images (including graphical symbols, background textures, halftone images, etc.) or text. The embedding or encoding of the message according to the variable protocols may, in some cases create visible structures or artifacts in which the message is not discernable by a human, yet is readable by an automated reader with knowledge of the protocol, including any keys used to scramble the message.

To provide a comprehensive disclosure without unduly lengthening the specification, applicants incorporate by reference the U.S. patent documents referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device). We also envision that the various components discussed herein, e.g., key generation, can be preformed by dedicated gates (e.g., silicon gates or other semi-conductor based electronic circuitry).

The particular combinations of elements and features in the above-detailed embodiments are exemplary only; the interchanging and substitution of these teachings with other teachings in this and the incorporated-by-reference patents/applications are also contemplated.

We claim:

1. A digital watermark key generation method, the key providing security for a plural-bit message, said method comprising:
    providing a plural-bit seed;
    randomizing the plural-bit seed;
    using a programmed electronic processor for encoding the randomized plural-bit seed with convolutional encoding, the encoded seed comprising a key; and
    transforming an independent message with the key, the independent message to be used in a digital watermark encoding process.

2. The method of claim 1 further comprising transforming an independent message with the key.

3. The method of claim 2 further comprising steganographically embedding the transformed message in media.

4. A digital watermark key generation method, the key providing security for a plural-bit message, said method comprising:
    providing a plural-bit seed;
    randomizing the plural-bit seed; and
    using a programmed electronic processor for encoding the randomized plural-bit seed with convolutional encoding, the encoded seed comprising a key, in which the convolutional encoding comprises tail-biting convolutional encoding.

5. The method of claim 4 further comprising transforming an independent message with the key.

6. The method of claim 5 further comprising steganographically embedding the transformed message in media.

7. A method of providing information to transform a plural-bit message for steganographic encoding, said method comprising:
    providing a unique plural-bit number;
    altering the unique plural-bit number;
    using a programmed electronic processor for error correction encoding the altered plural-bit number, wherein the error correction encoded, altered plural-bit number comprises a key for transforming an independent message for steganographic encoding.

8. The method of claim 7, wherein the error correcting comprises convolutional encoding.

9. The method of claim 8 wherein the convolutional encoding comprises tail-biting encoding.

10. The method of claim 7 further comprising transforming the message in media.

11. The method of claim 8 further comprising transforming the message in media.

12. The method of claim 9 further comprising transforming the message in media.

13. The method of claim 10 wherein, prior to transformation, the message comprises error correction encoding.

14. The method of claim 11 wherein, prior to transformation, the message comprises error correction encoding.

15. The method of claim 12 wherein, prior to transformation, the message comprises error correction encoding.

16. Logic gates formed in a silicon structure configured to perform the method recited in claim 1.

17. Logic gates formed in a silicon structure configured to perform the method recited in claim 2.

18. Logic gates formed in a silicon structure configured to perform the method recited in claim 3.

19. Logic gates formed in a silicon structure configured to perform the method recited in claim 5.

20. Logic gates formed in a silicon structure configured to perform the method recited in claim 9.

21. A programmed computing device comprising instructions for causing said device to perform the method of claim 1.

22. A programmed computing device comprising instructions for causing said device to perform the method of claim 4.

23. A programmed computing device comprising instructions for causing said device to perform the method of claim 7.

* * * * *